United States Patent [19]

Kitamura et al.

[11] 4,409,456
[45] Oct. 11, 1983

[54] WELDED CAN AND PROCESS FOR PREPARATION THEREOF

[75] Inventors: Yoichi Kitamura; Hisashi Hotta, both of Yokohama; Chikara Yurita, Kawasaki, all of Japan

[73] Assignee: Toyo Seikan Kaisha, Ltd., Tokyo, Japan

[21] Appl. No.: 240,824

[22] Filed: Mar. 5, 1981

[30] Foreign Application Priority Data

Mar. 8, 1980 [JP] Japan .................................. 55-28585

[51] Int. Cl.³ .......................... B23K 1/16; B23K 11/30
[52] U.S. Cl. ......................................... 219/64; 219/83
[58] Field of Search ................... 219/81, 82, 83, 91.21, 219/119, 92, 64, 118

[56] References Cited

U.S. PATENT DOCUMENTS

| | | | |
|---|---|---|---|
| 3,978,803 | 9/1976 | Asano et al. | 428/648 |
| 4,282,981 | 8/1981 | Kitamura et al. | 428/629 |
| 4,334,138 | 6/1982 | Matsuno et al. | 219/83 |

FOREIGN PATENT DOCUMENTS

49-36860  3/1974  Japan .................................. 428/648

OTHER PUBLICATIONS

Silman, H., et al., *Protective and Decorative Coatings for Metals*, p. 556, (1978).

Lyman, T., et al., *Metals Handbook*, 8th edition, vol. 2, p. 547, vol. 6, pp. 83 to 86.

*Primary Examiner*—Michael L. Lewis
*Attorney, Agent, or Firm*—Sherman & Shalloway

[57] ABSTRACT

Disclosed is a process for the preparation of welded cans, which comprises forming a blank comprised of a surface-treated steel plate into a cylinder and passing a lap portion of the formed cylinder between a pair of electrode rollers through an electrode wire to effect electric resistance welding, wherein said surface-treated steel plate comprises a layer of metallic tin or a tin-iron alloy formed on the steel plate substrate in an amount of 0.05 to 1.0 g/m² as calculated as metallic tin and a hydrated chromium oxide layer formed on said tin layer in an amount of 0.005 to 0.05 g/m² as calculated as metallic chromium and electric resistance welding is carried out in an inert atmosphere in the state where an electrode wire having a plating layer of tin or a tin alloy having a thickness of 0.1 to 20 μm is kept in close contact with the surface of said surface-treated steel plate.

In the inner and outer surface portions of the side seam of a welded can prepared according to this process, the thickness of the oxide layer is controlled below 400 Å and the amount of tin in these inner and outer surface portions is at least 60% of the amount of tin in the starting surface-treated steel plate, and this welded can is excellent in the corrosion resistance, lacquer adhesion and appearance characteristics of the seam.

6 Claims, 8 Drawing Figures

WELDED CAN AND PROCESS FOR PREPARATION THEREOF

BACKGROUND OF THE INVENTION (1) Field of the Invention

The present invention relates to a novel welded can and a process for the preparation thereof. More particularly, the present invention relates to a novel welded can formed of a surface-treated steel plate having a layer of metallic tin or a tin-iron alloy and a hydrated chromium oxide layer formed thereon, in which the corrosion resistance, lacquer adhesion and appearance characteristics are highly improved by the presence of these covered layers on the inner and outer surfaces of the weld seam, and a process for the preparation of this novel welded can.

(2) Description of the Prior Art

As the conventional can-forming method ordinarily adopted in the art, there can be mentioned a method in which a can blank such as tinplate is formed into a cylinder and both the side edges are bonded together by lap seaming, lock seaming or combination thereof using a solder or adhesive. This conventional method, however, is defective in that a considerable area is necessary for the seam portion, and the method is not preferred from the viewpoint of saving of resources. Moreover, the bonded can prepared according to this method is insufficient in the strength and durability of the seam. Furthermore, when the seam is formed by using a solder or adhesive, since there is present a considerable step difference in the side seam, leakage is readily caused in this step portion if a can end is double-seamed to the can body.

As the can-forming method that has heretofore been adopted instead of the method using a solder, there can be mentioned a draw-ironing method. Although so-called seamless cans prepared according to this method are used in some fields, these seamless cans cannot be used at all as vacuum cans, that is, cans which are subjected to retort sterilization after packing of contents, because the side wall of the can body is drastically deformed under pressure in these seamless cans. As another instance of the can-forming method that can be used instead of the method using a solder, there is known a method in which both the side edges of the can blank are lap-bonded together by welding. In a so-called welded can prepared according to this method, the area of the lap seam portion is smaller than in the soldered can and the thickness of the seam portion is relatively thin. Therefore, the above-mentioned problem of the step difference is moderated in the welded can, and furthermore, the welded can is advantageous over the bonded can, because a particular bonding agent such as a solder or adhesive need not be used. However, when a certain kind of a can stock is used, the can-forming operations become complicated, and the conventional welded cans are still insufficient in the corrosion resistance, lacquer adhesion and appearance characteristics of the seam.

A welded seam can is ordinarily prepared by forming a can stock into a cylinder, and subjecting the side edges to be lapped of the cylinder to electric resistance welding by passing the side edges between a pair of upper and lower electrode rollers optionally through an electrode wire.

Tin-free steel obtained by subjecting a cold rolled steel plate to an electrolytic treatment with chromic acid, which is used as a can stock, is cheaper and more readily available than other can stocks such as tinplate, and tin-free steel is advantageous in that it is excellent in the corrosion resistance and lacquer adhesion. However, this tin-free steel (hereinafter referred to as "TFS") involves the following problem. Namely, since a chromium oxide layer having a high electric resistance is inevitably present on the outer surface, flow of an electric current is inhibited by this layer when the above-mentioned electric resistance welding is carried out. Therefore, a troublesome operation of removing this chromium oxide layer covered on the steel substrate should be conducted prior to the welding operation, with the result that the conventional method of preparing welded TFS cans has a disadvantage in that the number of steps in the process is increased. Furthermore, since the steel substrate is exposed in the bonded area by removal of the chromium oxide layer, the corrosion resistance and lacquer adhesion are inevitably degraded in this area. Removal of the chromium oxide layer is ordinarily accomplished by mechanically cleaning the portions to be lapped of the can stock. At this cleaning step, the chromium oxide layer or coated lacquer in other areas is damaged by pieces or particles separated from the can stock by cleaning, and another problem of incorporation of these pieces or particles into the packed content arises.

When a conventional tin-plated steel plate, that is, tinplate, is used as the can stock, the above-mentioned problem of inhibiting of flow of a welding current does not arise, but tin is a very expensive metal, exhaustion of which is a world-wide problem, and it is eagerly desired to reduce the amount of tin. However, reduction of the amount of tin should naturally result in reduction of the corrosion resistance in the obtained cans, and especially in case of welded cans, extreme increase of a contact resistance between the can stock and the electrode roller or electrode wire is brought about by reduction of the amount of tin and various disadvantages are developed. For example, the temperature of the inner and outer surfaces of the lapped portion is extremely elevated to cause splashing (a phenomenon of extrusion of molten iron from the seam), the protecting effect is degraded or lost by scattering of fumes from the plated tin layer and oxidation is promoted by such high temperature, with the result that the appearance characteristics, corrosion resistance and lacquer adhesion of the seam are degraded.

SUMMARY OF THE INVENTION

It is therefore a primary object of the present invention to provide a welded can which is formed of a surface-treated steel plate having a plated tin layer much smaller in the thickness than in conventional tin plate and a hydrated chromium oxide layer formed thereon and is excellent in the appearance characteristics, corrosion resistance and lacquer adhesion of the seam.

Another object of the present invention is to provide a welded can in which the above-mentioned covered layers are retained even in both the inner and outer surface portions of the weld seam.

Still another object of the present invention is to provide a process in which the above-mentioned surface-treated steel plate can be subjected to electric resistance welding without removal of the hydrated chromium oxide layer.

A further object of the present invention is to provide a method in which a welded seam excellent in the above-mentioned properties can be formed without substantial reduction of the amount of tin of the above-mentioned surface-treated steel plate in both the inner and outer surface portions of the weld seam or without substantial increase of the thickness of the chromium oxide layer, that is, without necessity of removing the surface layer by mechanical polishing such as edge cleaning prior to welding.

In accordance with one fundamental aspect of the present invention, there is provided a process for the preparation of welded cans, which comprises forming a blank comprised of a surface-treated steel plate into a cylinder and passing a lap portion of the formed cylinder between a pair of electrode rollers through an electrode wire to effect electric resistance welding, wherein said surface-treated steel plate comprises a layer of metallic tin or a tin-iron alloy formed on the steel plate substrate in an amount of 0.05 to 1.0 $g/m^2$ as calculated as metallic tin and a hydrated chromium oxide layer formed on said tin layer in an amount coated of 0.005 to 0.05 $g/m^2$ as calculated as metallic chromium and electric resistance welding is carried out in an inert atmosphere in the state where an electrode wire having a plating layer of tin or a tin alloy having a thickness of 0.1 to 20 μm is kept in close contact with the surface of said surface-treated steel plate.

In accordance with another aspect of the present invention, there is provided a welded can which is formed of a surface-treated steel plate and has a side seam formed by welding, wherein said surface-treated steel plate comprises a layer of metallic tin or a tin-iron alloy formed on the steel plate substrate in an amount of 0.05 to 1.0 $g/m^2$ as calculated as metallic tin and a hydrated chromium oxide layer formed on the tin layer in an amount of 0.005 to 0.05 $g/m^2$ as calculated as metallic chromium, and the thickness of the oxide layer is controlled to less than 400 Å in the inner and outer surface portions of the side seam and the amount of tin in the inner and outer surface portions of the side seam is at least 60% of the original coated amount of tin in the surface-treated steel plate.

BRIEF DESCRIPTION OF THE DRAWINGS

In the drawings, reference numerals 1, 2, 3, 4, 5, 6, 7, 8, 9, 10, 10', 11, 11' and 12 represent a can blank, a side edge, a side seam, a steel plate substrate, a tin-iron alloy layer, a hydrated chromium oxide layer, an intermediate layer, an oxide layer, a chromium oxide layer, an electrode wire, an electrode wire, an electrode roller, an electrode roller and a material to be welded, respectively, and symbols A, B, C and D indicate curves of concentrations of oxygen, iron, tin and chromium, respectively.

DETAILED DESCRIPTION OF THE PREFERRED EMBODIMENTS

Figure 1:
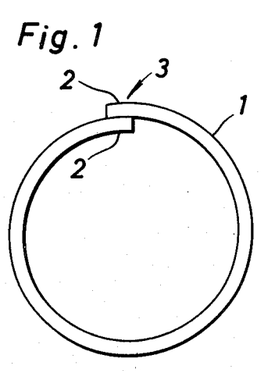
FIG. 1 is a top plan view showing the welded can according to the present invention.

Referring to FIG. 1 illustrating the welded seam can according to the present invention, a blank 1 comprised of a specific surface-treated steel plate is formed into a cylinder, and both the side edges 2 are lapped and bonded together by specific welding means described in detail hereinafter to form a side seam.

Figure 2:
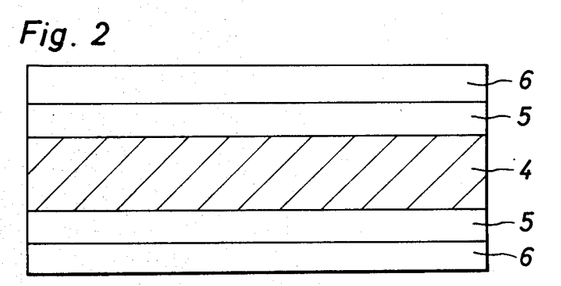
FIG. 2 is an enlarged sectional view illustrating a blank of the welded can according to the present invention.

Referring to FIG. 2 illustrating the sectional structure of this blank 1 in the magnified manner, the blank 1 comprises a steel plate substrate 4, a layer 5 of metallic tin or a tin-iron alloy formed on the substrate 4 and a hydrated chromium oxide layer 6 formed on the layer 5. The metallic tin or tin-iron alloy layer 5 has an amount of 0.05 to 1.0 $g/m^2$ as calculated as metallic tin, and the hydrated chromium oxide layer 6 has an amount of 0.005 to 0.05 $g/m^2$ as calculated as metallic chromium. In order to attain the objects of the present invention, it is important that these amounts of the layers 5 and 6 should be within the above-mentioned ranges. More specifically, if the amount of tin is too large and exceeds the above-mentioned range, the object of reducing the cost of the blank by decreasing the amount of tin as compared with that in conventional tinplate is not satisfactorily attained, and if the amount of tin is too small and is below the above-mentioned range, the contact resistance between the can blank and the electrode wire is increased and troubles such as mentioned above are caused, and a welded can cannot be prepared advantageously at a high welding speed. The hydrated chromium oxide layer has a close relation to the adhesion of a lacquer or the like. If the amount of chromium is too small and is below the above-mentioned range, adhesion of the lacquer coating film often becomes insufficient, and if the amount of chromium is too large and exceeds the above-mentioned range, troubles such as mentioned above by insufficient flow of a welding current are caused. Furthermore, if the amount of tin is too small or the amount of the chromium oxide is too large, the processability of the welded can to flange forming, double seaming or the like is degraded.

This surface-treated steel plate is prepared according to a customary method, such as disclosed in Japanese Patent Application Laid-Open Specification No. 23833/78 or 26236/78, in which the surface of a cold rolled steel plate is degreased and pickled, the cold rolled steel plate is subjected to electrolytic tin plating so that the amount of tin is in the above-mentioned range, and the steel plate is washed with water and then subjected to an electrolytic chromic acid treatment so that the amount of chromium is in the above-mentioned range. The plated layer of tin is converted to a layer of a tin-iron alloy, if necessary, by carrying out a heat treatment (reflow treatment). A known tin plating solution is used for plating of tin. For example, there may be used acidic tin plating solutions such as a stannous sulfate solution and a stannous chloride solution, and alkaline tin plating solutions such as a sodium stannate solution and a potassium stannate solution. The electrolytic chromic acid treatment is accomplished by carrying out a cathodic treatment at 5 to 20 coulomb/dm² in a solution containing chromic acid and at least one member selected from additives such as sulfuric acid, fluorine compounds, aromatic disulfonic acids and thiourea. Of course, the surface-treated steel plate that is used in the present invention is not limited to those prepared according to the above-mentioned method, and any of methods may optionally be adopted, so far as the above-mentioned coating structure is formed.

The welded can according to the present invention is most characterized in that the above-mentioned surface-treated steel plate is used as the can stock, the thickness of the oxide layer is controlled below 400 Å in both the inner and outer surface portions of the side seam formed by welding and the amount of tin in the inner and outer surface portions is at least 60% of the amount of tin in the starting surface-treated steel plate.

In the case where a tinplate blank is subjected to electric resistance welding according to known procedures, the plating layer of tin is ordinarily molten at the welding process and migrates into an electrode member or scatters in the form of fumes. Accordingly, the protecting effect of the tin layer is lost and black or blue iron oxide (presumably $Fe_3O_4$) is readily formed on the surface. The thickness of the coating layer of such iron oxide becomes 700 to 3000 Å, and such defects as reduction of the appearance characteristics of the seam, reduction of the corrosion resistance and insufficient adhesion of the lacquer coating are developed.

In contrast, in the welded can according to the present invention, tin desirable for prevention of oxidation and maintenance of good corrosion resistance is retained in the outer surface portion of the seam at such a high level as corresponding to at least 60% of the amount of tin in the original blank, and the oxide layer formed on the outermost surface portion is extremely thin and substantially colorless, whereby the appearance characteristics, corrosion resistance and lacquer adhesion of the seam are highly improved.

Figure 3:
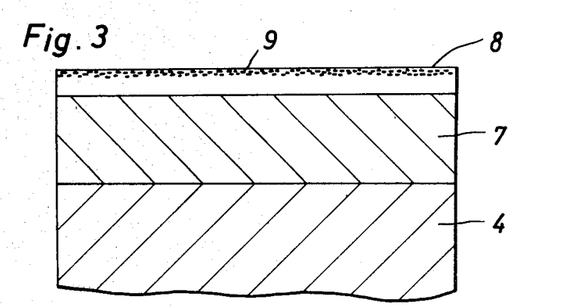
FIG. 3 is an enlarged sectional view illustrating the side seam portion of the welded can shown in FIG. 1.

In the welded can according to the present invention, the oxide layer 8 is comprised of chromium oxide, iron oxide and tin oxide, and the chromium oxide 9 is distributed in the outermost surface. The layer of metallic tin or tin-iron alloy is present next to the chromium oxide 9. Transition of the oxide layer to the metallic tin or tin-iron alloy layer may be stepwise or continuous.

Referring to FIG. 3 illustrating the outer surface portion of the side seam 3 in the magnified manner, the welded can according to the present invention comprises a steel substrate 4, an intermediate layer 7 of metallic tin or an iron-tin alloy 7 formed on the steel substrate 4 and an oxide layer 8 formed on the intermediate layer 7.

In the present invention, the composition of the layer 7 composed mainly of the iron-tin alloy is not particularly critical, but it is believed that the Fe/Sn atomic ratio in the layer 7 is in the range of from 10/1 to 1/3.

Figure 4:
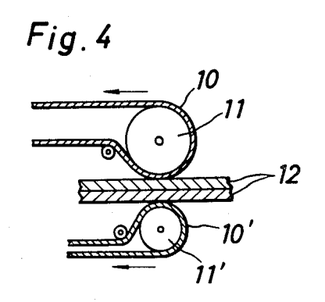
FIG. 4 is a diagram illustrating the method for the preparation of welded cans according to the present invention.
Figure 5:
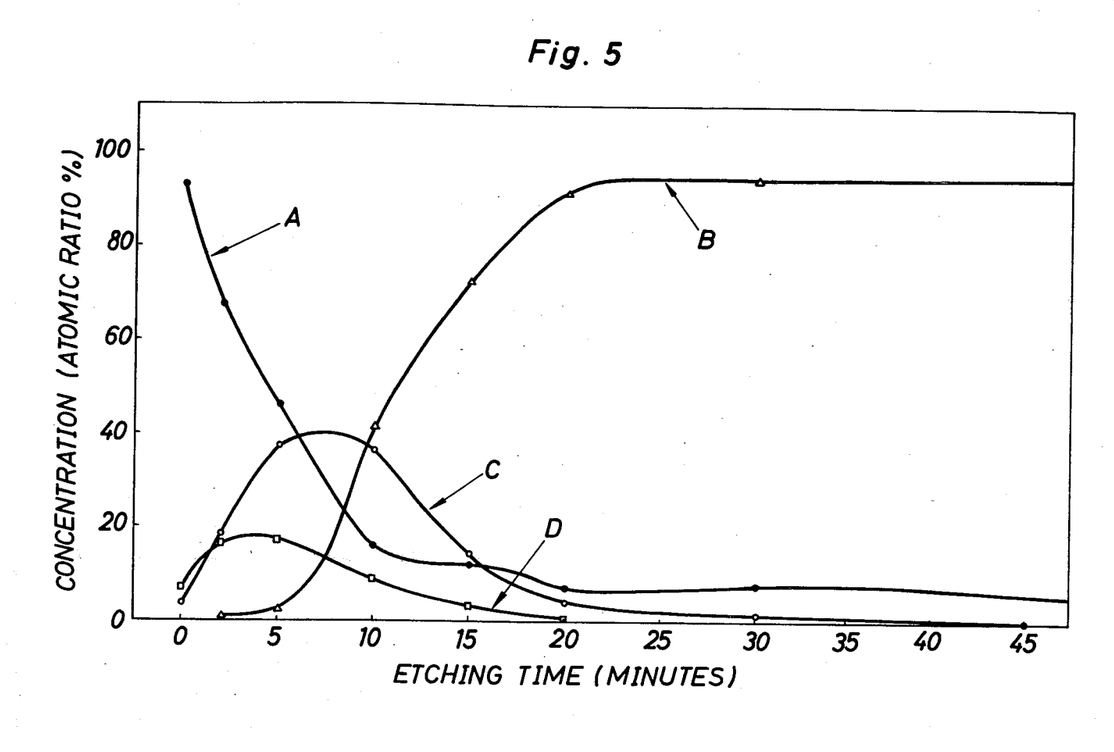
FIG. 5 is a graph showing the concentration ratios of the respective elements in the surface portion of the material before welding in Example 1.

Referring to FIG. 4 showing the can-forming process of the present invention, since the above-mentioned treated steel plate is directly subjected to the welding treatment, it is important that an electrode wire provided with a plating layer of a soft metal selected from the group consisting of tin and a tin alloy should be used as the electrode wires 10 and 10'.

It has already been known from Japanese Patent Publication No. 36860/74 that an electrode wire provided with a plated layer of a soft metal such as tin having a thickness of 30 to 300 μm is used for electric resistance welding of a plated steel plate such as tinplate. In the present invention, the thickness of the plated layer in each of the electrode wires 10 and 10' is controlled to a very low level, that is, 0.1 to 20 μm, preferably 0.15 to 2 μm, and it has been found that by virtue of this characteristic feature, even a material having a very small thickness in the plated layer of tin and including a coated layer of chromium oxide having a high electric resistance, which is formed on the tin plated layer, can be seam-welded very conveniently. More specifically, in the above-mentioned known method, a relatively thick plated layer is interposed so as to reduce the electric resistance between the material to be welded and the electrode wire, whereas, it has been found, if the thickness of the plated layer on the electrode is reduced according to the present invention in contrast with the above-mentioned patent, welding of a material having a very thin plated layer of tin and a chromium oxide layer of a high electric resistance formed on the tin plated layer can be accomplished very effectively and advantageously. When confronting laps are seam-welded, in order to obtain a weld seam excellent in the corrosion resistance, lacquer adhesion and appearance characteristics, it is important that the temperature of the both outer surface portions should be much lower than the temperature of the central portion of the laps, and this preferred temperature distribution can be provided in the lapped portion by using the electrode wires 10 and 10' provided with a specific plated layer having the above-mentioned thickness.

When the thickness of the plated layer of the electrode wire is too large and exceeds the above range, the temperature of the both outer surfaces of the lapped portion becomes too high at the welding process and the above-mentioned characteristics are degraded. It is believed that the reason is that slip is readily caused between the electrode wire and the surface of the can blank if the thickness of the plated layer is too large. If the thickness of the plated layer is too small and is below the above range, the amount of tin left on the surface of the can body is extremely reduced and the iron-exposed area is increased.

A copper wire substrate having the above-mentioned plated layer formed thereon is used for each of the electrode wires 10 and 10', and it is preferred that the sectional shape of the electrode wire be flat and the sectional area of the electrode wire be 0.2 to 4 mm.

In order to control the thickness of the oxide layer below 400 Å and maintain the amount of tin at a high level, it is important that electric resistance welding should be carried out in a non-oxidizing atmosphere. As the non-oxidizing atmosphere, there can be used, for example, nitrogen, argon, neon, helium, hydrogen and carbon monoxide. It is preferred that the welding operation be carried out in the state where a portion to be welded is maintained in a current of an inert gas such as mentioned above. The welding operation may be carried out in a sealed vessel filled with the above-mentioned inert gas. In order to control the thickness of the oxide layer within the above-mentioned range, it is preferred that a non-oxidizing atmosphere be used until the surface temperature of the welded portion is lowered to 550° C.

Figure 6:
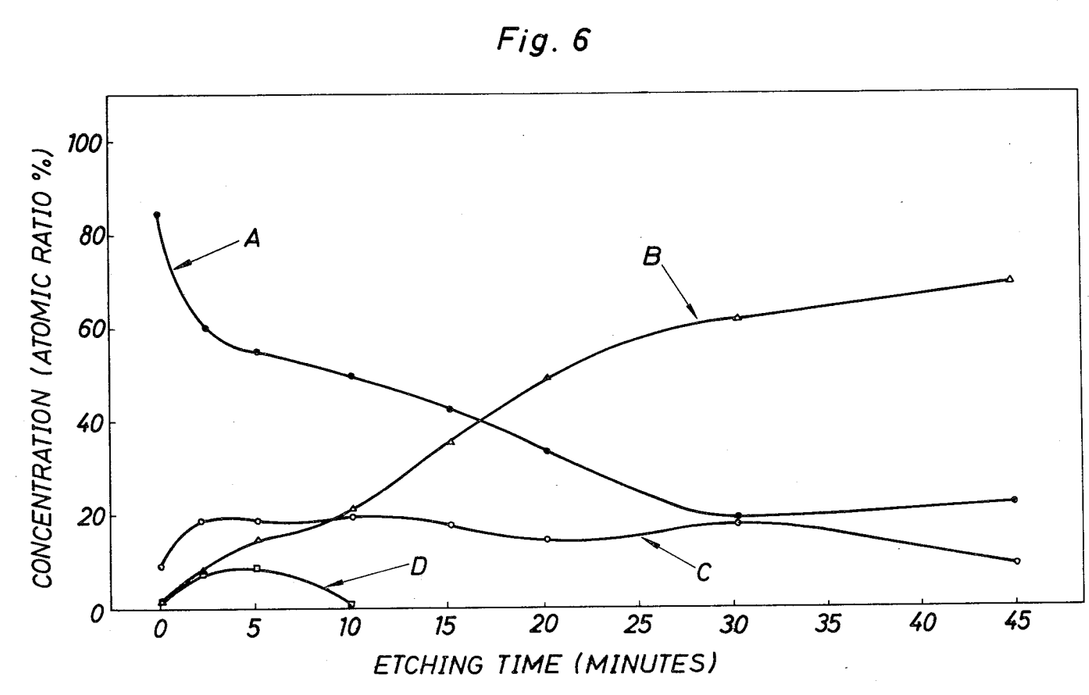
FIG. 6 is a graph showing the concentration ratios of the respective elements in the welded surface portion after welding conducted by using a tin-plated copper wire in a non-oxidizing atmosphere in Example 1.
Figure 7:
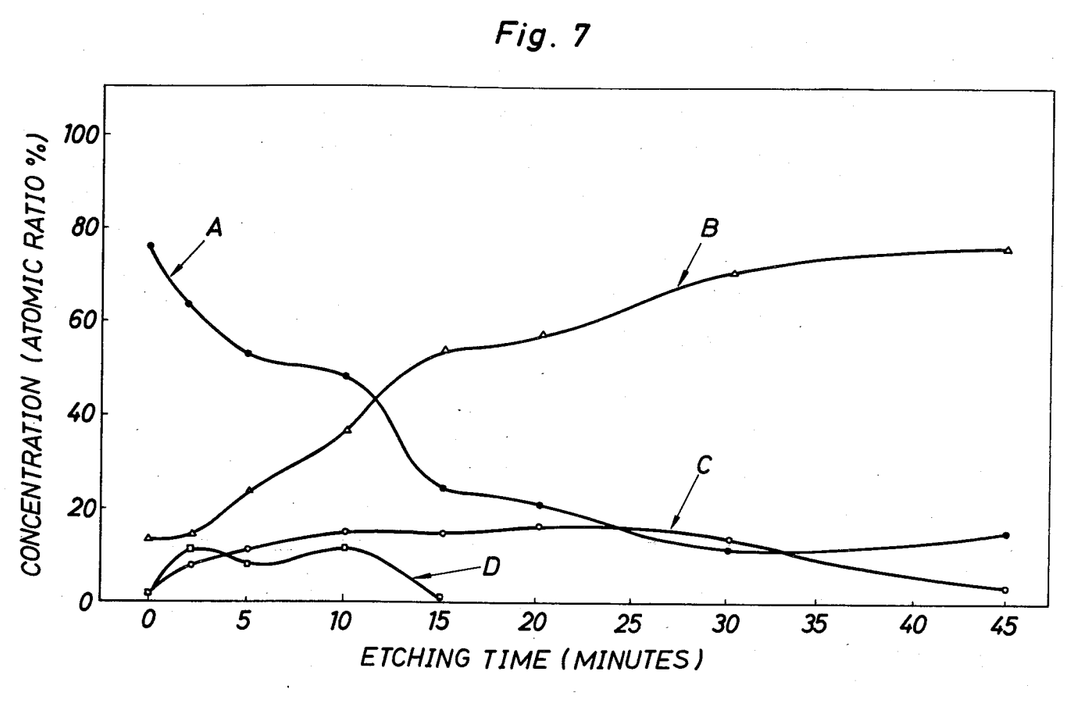
FIG. 7 is a graph showing the concentration ratios of the respective elements in the welded surface portion after welding conducted by using a copper wire in a non-oxidizing atmosphere in Comparative Example 1.
Figure 8:
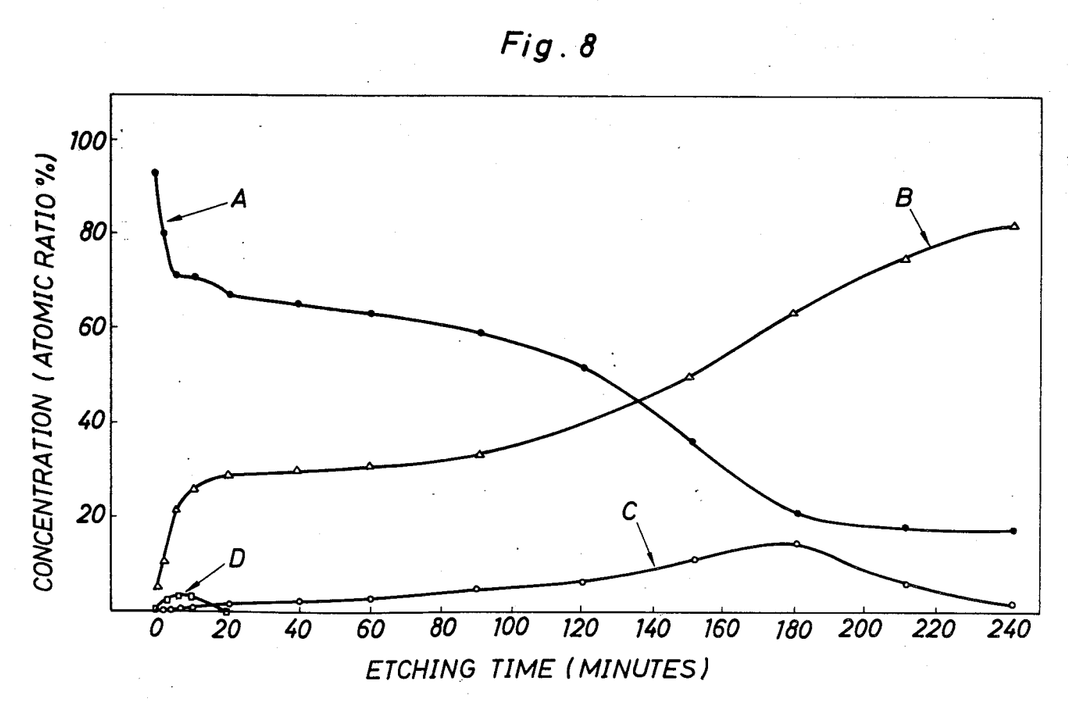
FIG. 8 is a graph showing the concentration ratios of the respective elements in the welded surface portion after welding conducted by using a copper wire in air in Comparative Example 2.

In the present invention, the thickness of the surface oxide layer is determined by measuring the atomic concentration ratio by ESCA [electron spectroscopy for chemical analysis (X-ray photoelectron spectroscopy)] while etching the surface in Ar gas. When etching of the welded portion of a can formed by welding in a non-oxidizing atmosphere is conducted at a rate of 15 Å/min, the oxygen concentration is highest on the outermost surface portion and the oxygen concentration is gradually reduced with advance of etching, and the oxygen concentration becomes constant within about 20 to about 30 minutes. It is therefore considered that the thickness of the surface oxide layer is smaller than 400 Å (see FIG. 6).

The pressure to be applied to the lapped portion through the electrode wires is suitably 20 to 90 Kg per welding point, and this pressure is applied by the electrode rolls 11 and 11'. Power sources of an alternating current, a direct current and a rectified wave current may be used as the power source for the electric resistance welding. Voltages and currents customarily adopted in manufacture of welded cans can be used in the present invention.

In the welded can according to the present invention, tin which is desirable for maintaining a high corrosion resistance is retained at a high level in the outer and inner surface portions of the seam and the thickness of the oxide layer formed by welding is controlled to a very low level. Accordingly, welded cans which are excellent in the corrosion resistance, lacquer adhesion and appearance characteristics can advantageously be provided at low costs with the use of a material having a much reduced amount of tin according to the present invention.

The present invention will now be described in detail with reference to the following Examples that by no means limit the scope of the invention.

EXAMPLE 1

Welded cans were prepared from a blank having an amount of tin of 0.30 g/m² on both the top and bottom surfaces, an amount of chromium oxide of 7.7 mg/m² as calculated as metallic chromium, a thickness of 0.24 mm and a hardness of T4 by welding under conditions described below in a current of an N₂ gas by using flat tin-plated copper wires having a plating thickness of 0.5 μm as wire electrodes 10 and 10' shown in FIG. 4.

Welding Conditions:

Welding speed of 30 m/min
Electrode-applied pressure of 50 Kg
Overlap length of 0.4 mm

COMPARATIVE EXAMPLE 1

Cans were prepared by carrying out the welding operation under the same conditions with the use of the same blank as in Example 1 except that copper wires were used as the electrode wires 10 and 10'.

COMPARATIVE EXAMPLE 2

Can were prepared by carrying out the welding operation under the same conditions with the use of the same blank as in Example 1 except that the N₂ gas was not used but air was used as the welding atmosphere instead and copper wires were used as the electrode wires 10 and 10'.

The results obtained in Example 1 and Comparative Examples 1 and 2 are shown in Table 1 and FIGS. 5 through 8.

TABLE 1

|  | Example 1 | Comparative Example 1 | Comparative Example 2 |
| --- | --- | --- | --- |
| Electrode wires | tin-plated copper wires | copper wire | copper wire |
| Welding atmosphere | $N_2$ | $N_2$ | air |
| Welding-allowable range* | 3510–3640 A | 3430–3460 A | 3430–3460 A |
| Thickness of oxide layer | 300 Å | 300 Å | 2900 Å |
| Amount of residual tin | 0.22 g/m² | 0.12 g/m² | 0.07 g/m² |
| Relative value of iron-exposed area** | 25 mA | 60 mA | 80 mA |
| Rusting test*** |  | X | X |

Note

Welding-allowable range*:

The welding current value at the time when molten iron was first extruded out from the welded portion at the welding process was defined as the upper limit value, and the welding current value at the time when non-welding was caused on the welded portion at the welding process was defined as the lower limit value. The range between these upper and lower limit values was defined as the welding-allowable range. The broader is this welding-allowable range, the more easily can be performed the welding operation.

Measurement of relative value of iron-exposed area**:

A can was filled with a buffer solution containing 0.2 mole/l of sodium carbonate and 0.2 mole/l of sodium bicarbonate and having a pH value of 10, and the iron-oxidizing current was measured by using the can as the anode and graphite as the cathode to determine the relative value of the iron-exposed area. The iron-oxidizing current is substantially proportional to the iron-exposed area. The voltage of a constant voltage device used for this measurement was arranged to a level where the current of oxidation of Sn and Cr could be neglected. The specimen used at this measurement was sampled by cutting the test piece along 50 mm in the welding direction and along 10 mm in the lateral direction, and therefore, the area of the specimen was 50 mm × 10 mm.

Rusting test***:

A 5% salt solution maintained at 37° C. was sprayed to the sample for 30 minutes and the rusting state was observed with the naked eye. In Table 1, samples were compared with respect to the degree of rusting, and the sample having a higher degree of rusting is indicated by mark "X" and the sample having a lower degree of rusting is indicated by mark "O."

Incidentally, the amounts of Fe, Sn, Cr and O on the surface of the welded portion, which are shown in FIGS. 5 through 8, were determined from the element concentration ratio measured by using ESCA [electron spectroscopy for chemical analysis (X-ray photoelectron spectroscopy)] while etching the surface in an Ar gas. The etching speed was 15 Å/min for Fe, 8 Å/min for Sn, 26 Å/min for Cr and 15 Å/min for O.

EXAMPLE 2

Welded cans were prepared from (1) a blank having an amount of tin of 0.30 g/m² on both the top and bottom surfaces, a chromium oxide amount of 5.0 mg/m² as calculated as metallic chromium, a thickness of 0.24 mm and a hardness of T4 and (2) a blank having an amount of tin of 0.5 g/m² on both the top and bottom surfaces, a chromium oxide amount of 4.0 mg/m² as calculated as metallic chromium, a thickness of 0.24 mm and a hardness of T4 by carrying out the welding operation under conditions described below in air of N₂ gas by using flat copper wires or flat tin-plated copper wires.

Welding Conditions:
Welding speed of 30 m/min
Electrode-applied pressure of 50 Kg
Overlap length of 0.4 mm The obtained results are shown in Table 2.

TABLE 2

| Blank | Electrode Wire | Welding Atmosphere | Relative Value of Iron-Exposed Area | Thickness of Oxide Layer | Amount of Residual Tin |
|---|---|---|---|---|---|
| blank (1) | copper wire | N₂ | 10.0 mA | 300 Å | 0.15 g/m² |
| " | copper wire | air | — | — | — |
| " | tin-plated copper wire | N₂ | 4.7 mA | 300 Å | 0.23 g/m² |
| " | tin-plated copper wire | air | — | — | — |
| blank (2) | copper wire | N₂ | 8.4 mA | 350 Å | 0.15 g/m² |
| " | copper wire | air | 19.0 mA | 1800 Å | 0.13 g/m² |
| " | tin-plated copper wire | N₂ | 4.5 mA | 250 Å | 0.32 g/m² |
| " | tin-plated copper wire | air | 9.0 mA | 1000 Å | 0.17 g/m² |

In Example 2, the relative value of the iron-exposed area was measured according to the same method as described in Example 1 except that a specimen obtained by cutting the test piece along 40 mm in the welding direction and along 3 mm in the lateral direction was used.

From the results of the foregoing Examples, it will readily be understood that the welded cans prepared according to the present invention are excellent over comparative welded cans in the easiness of the welding operation, the iron-exposed area on the welded surface and the rust-preventing effect.

What is claimed is:

1. A process for the preparatioon of welded cans, which comprises forming a blank comprised of a surface-treated steel plate into a cylinder and passing a lap portion of the formed cylinder between a pair of electrode rollers through an electrode wire to effect electric resistance welding, wherein said surface-treated steel plate comprises a layer of metallic tin or a tin-iron alloy formed on the steel plate substrate in an amount of 0.05 to 0.5 g/m² as calculated as metallic tin and a hydrated chromium oxide layer formed on said tin layer in an amount of 0.005 to 0.05 g/m² as calculated as metallic chromium and electric resistance welding is carried out in an inert atmosphere in the state where an electrode wire having a plated layer of tin or a tin alloy having a thickness of 0.15 to 2 μm is kept in close contact with the surface of said surface-treated steel plate.

2. A process according to claim 1, wherein electric resistance welding is carried out in the state where a pressure of 20 to 90 Kg is applied to said lap portion.

3. A process according to claim 1, wherein electric resistance welding is carried out in a current of an inert gas.

4. A process according to claim 1 or 3, wherein the inert gas is nitrogen.

5. A process according to claim 1, wherein after completion of welding, the lap portion is kept in an inert atmosphere until the surface temperature of the lap portion is reduced below 550° C.

6. A process according to claim 1 wherein the electric resistance welding is carried out under conditions such that the thickness of an oxide layer is controlled to less than 400 Å in the inner and outer surface portions of the lap portion and the amount of tin in the inner and outer surface portions of the lap portion is at least 60% of the original coated amount of tin of the surface-treated steel plate.

* * * * *